D. W. POMEROY.
Egg-Tester.

No. 213,687. Patented Mar. 25, 1879.

Witnesses:
H. F. Bruns.
Chas. Whitney

Inventor:
Daniel W. Pomeroy

UNITED STATES PATENT OFFICE.

DANIEL W. POMEROY, OF CHICAGO, ILLINOIS.

IMPROVEMENT IN EGG-TESTERS.

Specification forming part of Letters Patent No. 213,687, dated March 25, 1879; application filed January 20, 1879.

*To all whom it may concern:*

Be it known that I, DANIEL W. POMEROY, of the city of Chicago, county of Cook, and State of Illinois, have invented a new and useful Improvement in Egg-Testers, of which the following is a specification:

The object of my invention is to so construct a case or frame that eggs can be packed in it in sections or trays, (for storage, if so desired,) and held in such positions that they will, by being placed in a cool room, keep in good condition for some time, and can be transported and tested without repacking; and I do hereby declare the following specification, taken in connection with the annexed drawings, forming part hereof, to be such full, clear, and exact description thereof as will enable others skilled in the art to which my said invention relates to construct and use the same.

My invention consists, first, in the combination of a series of sections or trays having perforated bottoms; second, in the construction of a box with a skeleton partition, a light and one or more darkened or nearly darkened chambers, as will be more fully described.

In the accompanying drawings like letters in the different figures represent like parts.

Figure 1:
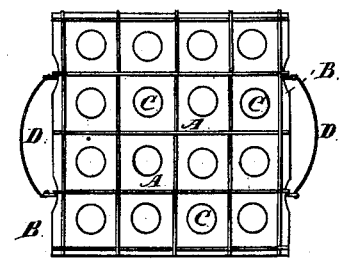
Figure 2:
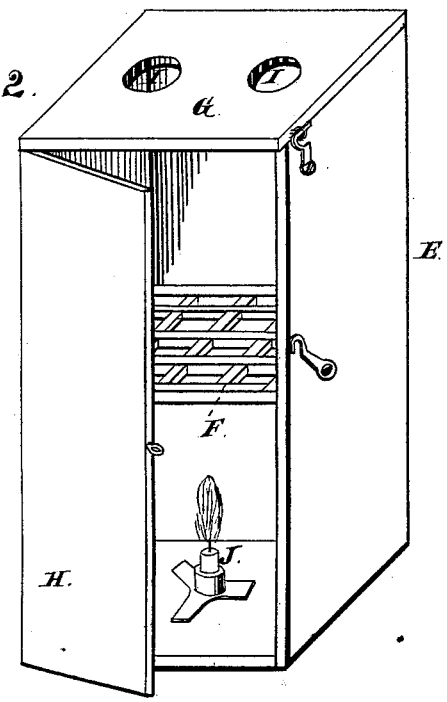
Figure 3:
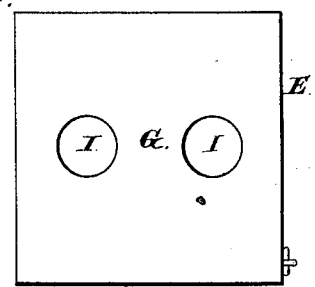
Figure 5:
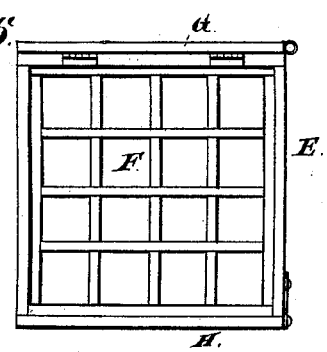
Figure 4:
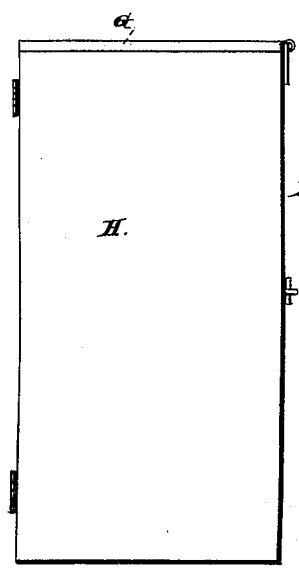

Figure 1 of the drawings represents a top view of a single section or tray of my egg-tester. Fig. 2 represents a perspective view of the outer case partially opened. Fig. 3 represents a top view of the outer case when closed—a top view when used as a tester, an end view when used as a case for shipment. Fig. 4 represents a side view of the outer case when closed. Fig. 5 represents a top view of same when used as a tester when open at the top.

A A represent a series of bottomless cells or compartments, which may be constructed in the usual manner of egg-carrier cells suited to receive one egg each; B, the perforated partition or removable perforated bottom to the tray, as shown in Fig. 1; C, the holes in same. The holes C are under the centers of the egg-cells A, and may be circular in form, or nearly so, to receive the eggs endwise, or may be somewhat oblong to receive the eggs crosswise. I prefer the circular form, for the reason that eggs keep in good condition much longer if held in a perpendicular position. By the use of the perforated partition, in connection with the ordinary egg-cells mostly in use at present, eggs will be held upright, whereas heretofore they would roll over on the side to a very great extent. D represents the handles to the tray.

E represents the outer case, which is used for the purpose of receiving the different trays of eggs for storage or shipment, and also for the purpose of testing them. The proportion of said case is as follows: The inside measure of the case lengthwise, after deducting the thickness of the skeleton partition, is twice the inside measure of the case crosswise and twice the distance from either end of case to skeleton partition. By this proportion the two compartments of the case can be filled with trays by opening the lid H; and when it is desired to test the eggs an empty case can be put on its end and a tray of eggs put in at the top by opening the lid *g*. As a matter of convenience, dealers could always have one empty case on hand, or a case similarly constructed with a view to use solely as a tester. F, the skeleton partition of same, which may be constructed as shown, or still more open. Sufficient support, however, should be retained to hold the perforated partition B in a plane, or nearly so. *g*, the top lid of same when used as a tester; H, the side lid of same when used as a tester; I, the openings in the lid *g*; J, the illuminating device used in the case E.

The size of the case can be increased to meet the requirements of any particular section, and the trays increased in proportion, both in number of trays and in number of cells in each tray.

I make the holes in the perforated partition B of such size that the eggs will pass through the partition about one-half or three-eighths of an inch. The holes should be made of a circular form, so as to shut off all light except that which comes through the eggs, or nearly all. On the bottom of the case I put a series of cells like those composing, in part, the tray, except that their height is only about three-fourths of an inch, on which I rest the first tray. I then put in the different trays one upon another until the trays fill the case.

When it is desired to test a quantity of eggs, lift out a section or tray by the handles D and put it in the box E, close the lids, and a glance through the openings I will be sufficient to test the number contained in the tray as effectually as they could have been tested heretofore by any known means, and in a great deal less time. The eggs should be in a darkened chamber, so that but little light comes to the eye except that which passes through the eggs. Sunlight may be used instead of artificial.

If the eggs are tested in a darkened room, the lid g is not necessary.

Having thus fully described my invention, what I claim, and desire to secure by Letters Patent, is—

1. The improved egg-tester, consisting of the combination, with the case E, of the skeleton partition F, lid g, having openings I, and the illuminating device J, as described.

2. The combination, with the case E, of skeleton partition F and illuminating device J, substantially as set forth.

3. The combination, with the case E, having skeleton partition F, of the illuminating device J and removable trays, as described.

DANIEL W. POMEROY.

Witnesses:
GEO. K. KONARD,
THOMAS SANFORD.